Aug. 25, 1942.  E. CHAPUT  2,293,698
EMERGENCY BRAKE INDICATOR
Filed Sept. 5, 1941

Inventor
Ernest Chaput
By H. F. Doyle
Attorney

Patented Aug. 25, 1942

2,293,698

UNITED STATES PATENT OFFICE 2,293,698

EMERGENCY BRAKE INDICATOR

Ernest Chaput, United States Army

Application September 5, 1941, Serial No. 409,691

2 Claims. (Cl. 116—124)

(Granted under the act of March 3, 1883, as amended April 30, 1928; 370 O. G. 757)

The invention described herein, if patented, may be manufactured and used by or for the Government for governmental purposes without the payment of any royalty thereon.

This invention relates to motor vehicle signals, and more particularly to an improved device arranged to indicate the position of the hand brake of a motor vehicle to the vehicle driver, and thus caution the driver against attempting to start the vehicle with the brakes applied.

An object of the invention is to provide an improved and simplified indicating device, consisting of a single mounting arm and indicator dial arranged to extend between a conventional hand brake lever and an orifice in a conventional type of instrument panel.

A further object of the invention is to provide an improved brake indicating device of extreme mechanical simplicity adapted to be applied to brake control mechanisms of widely differing dimensions and structural details.

A further object of the invention is to provide an incandescent electric indicating lamp associated with and arranged to illuminate the aforementioned indicator dial and instrument panel, and arranged to be energized in the event the vehicle driver attempts to start the vehicle with the brakes applied.

A further object of the invention is to provide an electrically energized audible signal, so arranged as to draw the attention of the vehicle driver to the brake indicator dial if the driver attempts to start the vehicle with the brakes applied.

These and other important objects are accomplished by the particular combination and arrangement of structures constituting a preferred embodiment of the present invention and illustrated in the accompanying drawing, in which.

Figures 1, 2, 3:
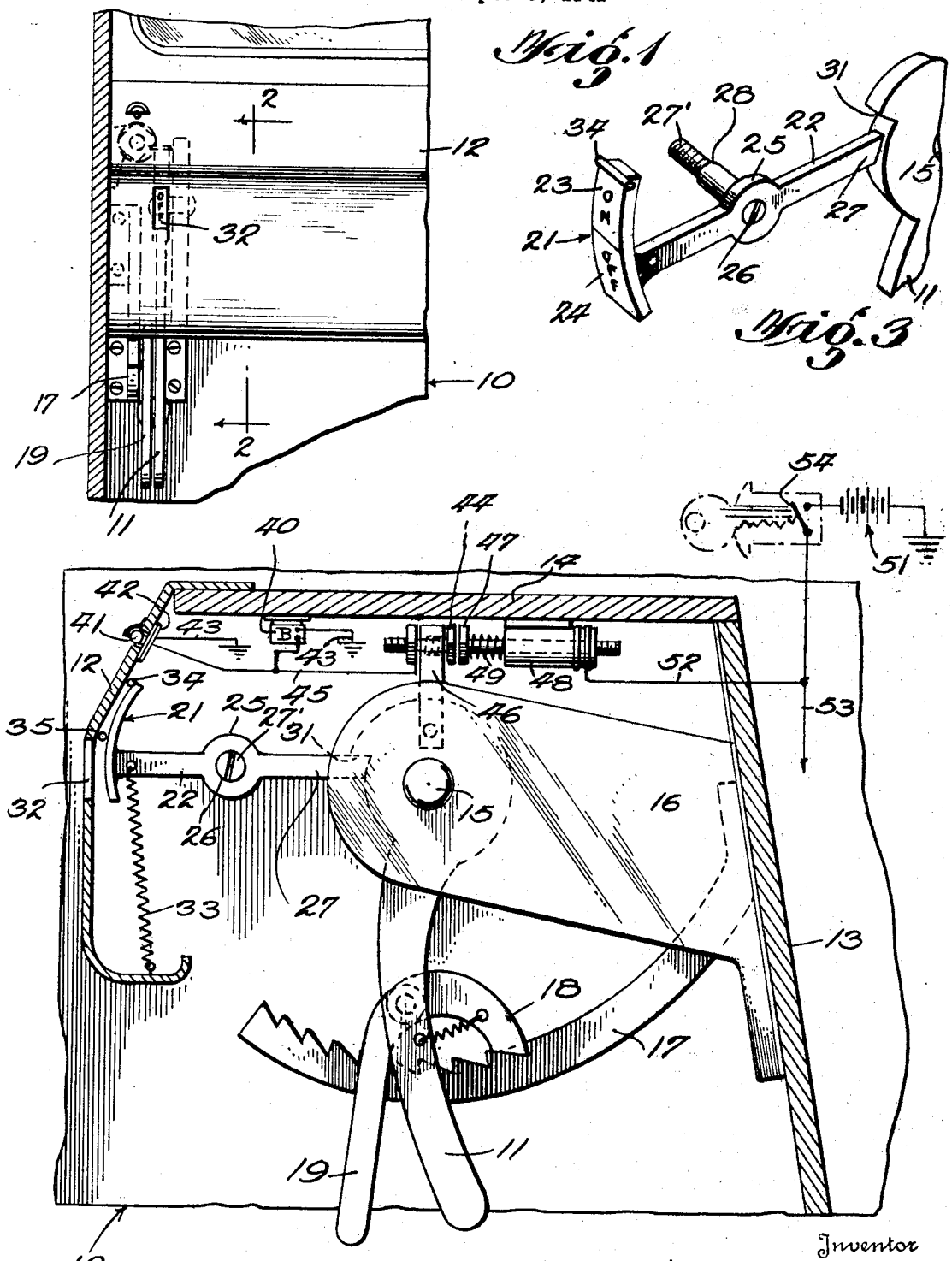
Fig. 1 is an elevational view, partly in section, of a conventional instrument panel and brake lever of a motor vehicle modified in accordance with the teachings of this invention.
Fig. 2 is a detail sectional view of the mechanism illustrated in Fig. 1, taken substantially on the plane of the line 2—2 of Fig. 1.
Fig. 3 is a detail perspective view of the indicator dial and mounting arm assembly.

Referring now more particularly to the drawing, it should be understood that the reference numeral 10 indicates any conventional type of motor vehicle, including a plurality of wheels, steering mechanism, and conventional braking structures associated with the wheels.

These brakes are ordinarily controlled by the conventional brake pedal, and in addition a hand brake or emergency brake lever 11 is arranged to retain the brakes in engaged position. As shown in the drawing, this hand lever 11 is arranged to extend downwardly from a point immediately forward of the instrument panel 12, behind the dash board 13, and below the top panel 14. This is a conventional type of construction in modern motor vehicles, and ordinarily the lever 11 is mounted on a fixed pivot 15 secured to a suitable form of bracket, such as the bracket 16 illustrated. A notched ratchet bar 17 is arranged to be engaged by the spring pressed dog 18 in such a manner as to latch the lever 11 in engaged position. The dog 18 is also provided with the release handle 19 so that the lever may be manually returned to its released position.

Before proceeding with the detailed description of the invention, it should be particularly noted that all of the structures thus far described are merely representative of a typical type of structure of modern motor vehicles, and since the exact details of construction of these elements are not essential to the practice of the present invention, except in combination with the structures hereinafter described, they will not be described in greater detail.

In fact, one of the objects of the invention is the provision of a brake indicator device so designed and constructed that one type of indicator may be applied to many types of brake mechanisms differing somewhat in design and construction, to the end that various makes and models of motor vehicles may be equipped with one standard type of indicator. In this connection, it may be noted that a fleet of vehicles as, for example, the motorized equipment of an army camp, usually includes many different types of motor vehicles, and it is essential that a standardized type of indicator be adopted for all of these vehicles, not only so that all of the personnel of the unit may have opportunity to become accustomed to one standard type of equipment, but also because it is regarded as an impractical undertaking to attempt to equip each vehicle with a special indicator especially designed for that model.

To this end the present invention provides an arcuate indicator dial 21 affixed to one end of a mounting arm 22, the arm being of a length sufficient to extend from the brake lever pivot 15 to the instrument panel 12 on any type of vehicle for which use of the device is contemplated. The indicator dial 21 is provided with surface portions 23 and 24 of contrasting colors, such as red and white, and legible indicia, as "On" and "Off," is printed on these surfaces to indicate the position of the brake hand lever 11. A mounting boss 25, including an orifice 26, is formed on the arm 22 at a point spaced away from the indicator dial, and the arm 22 extends beyond the boss 25 to form a trigger portion 27 adapted to be engaged by a notch 31 cut in the hub of the hand lever 11. The dial 21 and arm 22 are mounted in predetermined position with respect to the instrument panel 12 and lever 11 by pivoting these structures on a mounting screw 27' threaded into the wall of the vehicle body 10 and one or more spacing collars 28 are placed on the screw to space the arm 22 with any desired clearance from the side wall.

An orifice 32 is cut in the instrument panel 12 in such a position that the indicator dial 21 shall be visible through the orifice, the arrangement being such that when the brake lever 11 is in fully released position, as shown in the drawing, the white section 24 of the dial will be visible, and as the lever 11 is drawn rearwardly into partially engaged position the red section 23 moves into view of the operator. This movement is accomplished by the coil spring 33 extending between the arm 22 and the lower edge of the instrument panel 12.

It will be noted that the dial 21 is provided with a stop 34 positioned to engage the stop 35 affixed on the instrument panel, so that the red section 23 and printed indicia "On" are retained in proper alignment to be viewed through the orifice 32, even when the lever 11 is moved to its fully engaged position. When fully engaged, the notch 31 moves away from the trigger portion 27 of the arm 22 and provides a lost-motion connection between the brake lever 11 and the indicator dial 21 in order that the dial will present the red section 23 and indicia "On" whenever the brakes of the vehicle are partially applied and will remain in that position throughout the remaining range of movement of the brake lever. On the return movement of the brake lever, the white section 24 and the indicia "Off" will appear only when the lever 11 has moved to the last notch and the vehicle brakes ar fully released.

From the foregoing description, it will be seen that the particular structure and arrangement of parts disclosed herein provides an unusually simple type of indicating mechanisms, positive in operation and capable of easy installation in any type of vehicle.

Under certain conditions, it is considered desirable to provide an audible signal, or an incandescent electric lamp to indicate the position of the brake mechanisms if an attempt is made to start the vehicle with the brakes applied. To this end a buzzer 40 is mounted in any convenient location and an incandescent lamp 41 is mounted in a socket 42 above the dial 21. One of the terminals of the lamp 41 and buzzer 40 are grounded to the frame of the vehicle, as diagrammatically illustrated at 43, and the other terminals are interconnected with the electrical contact point 44 by the conductor 45.

The contact 44 is carried by an insulated arm 46 secured to the hand lever 11, and is arranged to move into contact with the contact 47 whenever the brake is engaged. The contact 47 is shiftably carried on an insulated mounting bracket 48 and a spring 49 is provided to permit continued movement of the lever 11 after the contacts engage. The electrical energy for the buzzer 40 and lamp 41 is supplied from the storage battery 51 of the vehicle, through the conductor 52. This may be accomplished by a direct connection between the battery 51 and the contact 47, if desired, but it is preferable to connect the conductor 52 as a branch of the ignition lead 53 in order that the buzzer and lamp will be inoperative when the ignition switch 54 is open.

In the event that the operator inadvertently attempts to operate the vehicle with the brakes applied, the buzzer 40 will sound and the lamp 41 will be illuminated to call his attention to the position of the dial 21. When the brake lever 11 is returned to the released position illustrated, the indicator will move to the "off" position to indicate that the vehicle is in condition for operation. Simultaneously, the contacts 44 and 47 will separate and the circuit to the buzzer 40 and lamp 41 will be broken.

Having thus described my invention, what I claim as new and desire to secure by Letters Patent is:

1. In a motor vehicle including brake mechanisms, and an instrument panel, the combination of a fixed pivot forwardly of said instrument panel and above its lower edge, a hand lever mounted on said pivot and extending downwardly to a point below the lower edge of the instrument panel, said hand lever being operatively interconnected with the brake mechanisms of the vehicle and being provided with a manually releasable latch mechanism adapted to maintain the lever and brake mechanism in engaged position; an orifice in the instrument panel at a point closely adjacent the upper portion of the hand lever, an indicator dial positioned forwardly of and closely adjacent the orifice in the instrument panel, said indicator dial including indicating surfaces to indicate the position of the brake mechanism of the vehicle, a mounting arm arranged to support the said indicator dial and to extend from the indicator dial toward the aforementioned hand lever, and a notch associated with the hand lever to actuate the mounting arm to shift the indicator dial from a position wherein one of its surfaces is presented to vision of the operator through the orifice in the instrument panel to a second position wherein the other surface is presented to view through said orifice, the positions of the indicator dial corresponding to and indicating the engaged and released positions of the hand lever.

2. In a motor vehicle including brake mechanism, and an instrument panel, the combination of a fixed pivot forwardly of said instrument panel and above its lower edge, a hand lever mounted on said pivot and extending downwardly to a point below the lower edge of the instrument panel, said hand lever being operatively interconnected with the brake mechanism of the vehicle and being provided with a manually releasable latch mechanism adapted to maintain the lever and brake mechanism in engaged position; an indicator dial positioned closely adjacent the instrument panel, said indicator dial including indicating surfaces of contrasting colors and bearing legible indicia to indicate the position of the brake mechanism of the vehicle, a mounting arm arranged to support the said indicator dial and to extend directly from the indicator dial to the aforementioned hand lever, and a pivotal mounting for the mounting arm and means associated with the hand lever to actuate the mounting arm to shift the indicator dial from a position wherein one of its surfaces is presented to vision of the operator to a second position wherein the other surface is presented to view, the positions of the indicator dial corresponding to and indicating the engaged and released positions of the hand lever.

ERNEST CHAPUT.